(12) United States Patent
Matsuura et al.

(10) Patent No.: US 8,177,050 B2
(45) Date of Patent: May 15, 2012

(54) COOLING METHOD OF CARRYING SECTION AND CARRIER

(75) Inventors: Masanari Matsuura, Chiryu (JP);
Sotaro Oi, Saitama (JP); Tomoyuki Kubota, Yatsushiro (JP)

(73) Assignee: Hirata Corporation, Tokyo (JP)

( * ) Notice: Subject to any disclaimer, the term of this patent is extended or adjusted under 35 U.S.C. 154(b) by 190 days.

(21) Appl. No.: 12/734,027

(22) PCT Filed: Oct. 24, 2008

(86) PCT No.: PCT/JP2008/069302
§ 371 (c)(1),
(2), (4) Date: Apr. 6, 2010

(87) PCT Pub. No.: WO2009/057516
PCT Pub. Date: May 7, 2009

(65) Prior Publication Data
US 2010/0206688 A1    Aug. 19, 2010

(30) Foreign Application Priority Data
Oct. 29, 2007  (JP) ................................ 2007-280013

(51) Int. Cl.
*B65G 13/02* (2006.01)
(52) U.S. Cl. ........................ 198/780; 198/952; 193/37
(58) Field of Classification Search ................ 198/952, 198/780, 782, 788; 193/35, 37 R
See application file for complete search history.

(56) References Cited

U.S. PATENT DOCUMENTS

| | | | |
|---|---|---|---|
| 5,301,785 A * | 4/1994 | Plesh, Sr. ...................... | 193/35 R |
| 6,464,062 B1 * | 10/2002 | Wendt et al. ................. | 193/35 R |
| 6,769,528 B2 * | 8/2004 | Plesh, Sr. ...................... | 193/35 R |
| 7,168,546 B2 * | 1/2007 | Plesh, Sr. ...................... | 193/35 R |

FOREIGN PATENT DOCUMENTS

| | | |
|---|---|---|
| JP | U-56-45847 | 4/1981 |
| JP | U-3-36832 | 4/1991 |
| JP | A-6-190827 | 7/1994 |
| JP | A-10-85821 | 4/1998 |
| JP | A-11-114745 | 4/1999 |
| JP | A-2004-299850 | 10/2004 |
| JP | A-2005-233809 | 9/2005 |
| JP | A-2006-111428 | 4/2006 |
| WO | WO 03-078908 A1 | 9/2003 |

OTHER PUBLICATIONS

Dec. 9, 2008 International Search Report issued in International Application No. PCT/JP2008/069302 filed Mar. 24, 2008.

* cited by examiner

*Primary Examiner* — James R Bidwell
(74) *Attorney, Agent, or Firm* — Oliff & Berridge, PLC

(57) ABSTRACT

In a cooling method of a carrying section including a conveyor for carrying an inverter component, a heating furnace covering a part of the carrying conveyor and heating the inverter component, and a mechanism for cooling the carrying conveyor and cooling the carrying conveyor by means of the cooling mechanism, the conveyor for carrying the inverter component is provided with a roller for carrying the inverter component by touching it, a roller cooling member surrounding the outer periphery of the carrying roller and having an opening for projecting a part of the outer periphery of the carrying roller is provided as the cooling mechanism, and the carrying roller heated by the heat of the heating furnace is cooled by the roller cooling member.

4 Claims, 11 Drawing Sheets

COOLING METHOD OF CARRYING SECTION AND CARRIER

TECHNICAL FIELD

The present invention relates to a technique for cooling a carrying conveyor.

BACKGROUND ART

For carrying a hot workpiece, it is necessary to use a chain conveyor having high resistance to heat or provide a cooling mechanism in a carrying system.

This is because when the carrying conveyor becomes hot, lubricant oil and grease applied to bearings and driving devices used in the carrying conveyor are apt to deteriorate. Accordingly, in the case where lubricant oil and grease are applied to parts to which heat is conducted, the parts have to be cooled so as to make heat conduction difficult. In the case where heat may be conducted to not only lubricant oil and grease but also parts on which heat-sensitive members and devices are mounted, it is also necessary cool them or provide a heat insulating material or member to prevent heat conduction.

Furthermore, the hot carrying conveyor causes such disadvantages that an operator cannot approach it and working environment deteriorates. Accordingly, the carrying conveyor including a cooling device has conventionally been employed.

For instance, there are cooling methods disclosed in Patent Literatures 1 to 3. Patent Literature 1 discloses a cooling technique of a slab carrier. This includes a cooling device for causing cooling water to pass through a roller table serving as a support part of a carrying roller. The cooling device is configured to prevent heat conduction to the roller table and a carriage.

Patent Literature 2 discloses a cooling technique of a carrier. This includes a base placed in a vacuum chamber, a linear table installed on the base, a linear guide for guiding the linear table, and a circulating passage and a heat receiving surface provided in the base. In this configuration, heat from the linear table is conducted to the heat receiving surface. This heat receiving surface is cooled by a cooling medium. Thus, deformation of the linear guide by heat and so on can be avoided.

Patent Literature 3 discloses a cooling technique of a vertical furnace. An in-case cooling medium communication passage is provided to cause a cooling medium to pass through the inside of a wall of a cylindrical case of the vertical furnace. Thus, a measurement device internally provided in the furnace can be protected from external heat.

CITATION LIST

Patent Literature

Patent Literature 1: JP 10 (1998)-085821 A
Patent Literature 2: JP 11 (1999)-114745 A
Patent Literature 3: JP 2005-233809 A

SUMMARY OF INVENTION

Technical Problem

However, when the carrying conveyor is cooled by use of such cooling techniques as disclosed in Patent Literatures 1 to 3, the following problems are considered to be caused.

There is a case where a carrying conveyor has to be placed in a heating furnace for heating and carrying a workpiece. In this case, a driving mechanism of the carrying conveyor is often provided outside the heating furnace to take measures against heat.

In the case where the carrying conveyor is a roller conveyor using carrying rollers, however, parts which will touch a workpiece carried and heated will be subjected to heat conduction from the heated workpiece. This increases the temperatures of the carrying rollers and the carrying conveyor themselves for carrying the workpiece.

It is therefore conceivable that the carrying conveyor is formed with a cooling medium passage for passing a cooling medium therethrough so that the conveyor is cooled by the flowing cooling medium as shown in Patent Literatures 1 to 3.

Meanwhile, for a carrying roller, members such as bearings are employed for improving slidability. A driving mechanism is required for driving the carrying roller. For lubricating those sliding parts, lubricant agents such as lubricant oil and grease have to be applied. However, even when the heat-resistant lubricant agent is used, an upper usable temperature limit is about 200° C. If the lubricant agent exceeds that temperature, cooling is required.

The simple configuration as disclosed in Patent literatures 1 to 3 that the cooling medium passage is formed linearly in a frame for carrying a workpiece could cool the roller table that holds the carrying roller but could not cool the carrying roller itself. In case the carrying roller is heated and thermally expands, it causes meandering of a workpiece. The workpiece may get snagged on the carrying conveyor, thus causing jamming or congestion.

In case the cooling efficiency is low, heat is likely to be conducted from the carrying roller to the sliding parts such as the bearings and the driving mechanism as mentioned above, leading to deterioration of lubricant oil and grease applied thereon.

Also, heat conduction to the bearings and the driving mechanism will cause the bearings to thermally expand themselves, leading to deformation and distortion thereof, thus lowering the performance of the bearings or stretching a belt and a chain used in the driving mechanism. These problems may affect carrying of workpieces.

In other words, the methods disclosed in Patent Literatures 1 to 3 are considered to be insufficient in cooling performance to cool the carrying conveyor in a heating furnace.

For measures against the above, it is conceivable to use unlubricated bearings made of ceramics and others. However, the ceramic bearing is high in cost and the use thereof in a place which may receive an impact is unfavorable. Therefore, the use of such bearing in the carrying conveyor is not so practical.

Alternatively, it is originally conceivable to use the structure of a chain conveyor having high resistance to heat. In the case of a processing method such as soldering for which foreign matters are unfavorable, the structure that may generate foreign matters is undesired.

The present invention has been made to solve the above problems and has a purpose to provide a cooling method of carrying section and a carrier, capable of efficiently cooling a carrying conveyor.

Solution to Problem

To achieve the above purpose, a cooling method of carrying section according to the present invention has the following characteristics.

(1) In the cooling method of carrying section for cooling a carrying conveyor by a cooling mechanism, the method comprising the carrying conveyor configured to convey a workpiece, a heating furnace configured to cover a part of the conveyor and heat the workpiece, and the cooling mechanism for cooling the conveyor, the carrying conveyor for conveying the workpiece includes a carrying roller that will contact with the workpiece and convey the workpiece; a roller cooling member is provided as the cooling mechanism, the roller cooling member being configured to surround the outer periphery of the carrying roller and include an opening through which a part of the outer periphery of the carrying roller protrudes; and the carrying roller heated by heat of the heating furnace is cooled by the roller cooling member.

(2) In the cooling method of carrying section set forth in (1), the roller cooling member internally holds a cooling pipe formed along the circular arc of the carrying roller, the pipe being configured to internally circulate a cooling medium.

(3) In the cooling method of carrying section set forth in (2), the roller cooling member includes a plurality of plate members, and the plate members are arranged, interposing the cooling pipe therebetween, in parallel with a direction of conveying the workpiece.

(4) In the cooling method of carrying section set forth in one of (1) to (3), the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

To achieve the above purpose, a carrier of the invention provides the following characteristics.

(5) In a carrier for cooling a carrying conveyor by a cooling mechanism, the carrier comprising the carrying conveyor for carrying a workpiece, a heating furnace for heating the workpiece while covering a part of the conveyor, and the cooling mechanism for cooling the conveyor, the carrying conveyor for carrying the workpiece includes a carrying roller that will contact with the workpiece and convey the workpiece; and a roller cooling member is provided as the cooling mechanism, the roller cooling member being configured to surround the outer periphery of the carrying roller and include an opening through which a part of the outer periphery of the carrying roller protrudes.

(6) In the carrier set forth in (5), the roller cooling member internally holds a cooling pipe formed along the circular arc of the carrying roller, the pipe being configured to internally circulate a cooling medium.

(7) In the carrier set forth in (6), the roller cooling member includes a plurality of plate members, and the plate members are arranged, interposing the cooling pipe therebetween, in parallel with a direction of conveying the workpiece.

(8) In the carrier set forth in one of (5) to (7), the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

Advantageous Effects of Invention

The cooling method of carrying section according to the present invention having the above characteristics can provide the following operations and advantages.

Firstly, the invention set forth in (1) is a cooling method of carrying section for cooling a carrying conveyor by a cooling mechanism, the method comprising the carrying conveyor configured to convey a workpiece, a heating furnace configured to cover a part of the conveyor and heat the workpiece, and the cooling mechanism for cooling the conveyor, wherein the carrying conveyor for conveying the workpiece includes a carrying roller that will contact with the workpiece and convey the workpiece; a roller cooling member is provided as the cooling mechanism, the roller cooling member being configured to surround the outer periphery of the carrying roller and include an opening through which a part of the outer periphery of the carrying roller protrudes; and the carrying roller heated by heat of the heating furnace is cooled by the roller cooling member.

In the case of employing the carrying conveyor including the above carrying roller for carrying a workpiece, in the heating furnace, there are conceivably heat input from a contact portion with the heated workpiece to the carrying roller and heat input from outside air to the carrying roller.

Accordingly, when the outer periphery of the carrying roller for carrying the workpiece is covered by the roller cooling member so that part of the roller protrudes therefrom and the roller cooling member is made of for example metal having a large heat capacity, the heat input from the outside air to the carrying roller can be restrained. The heat entering the roller when contacts with the workpiece can be lowered when the temperature of the roller cooling member is set to be lower than the carrying roller.

With the above configuration of the carrying conveyor, the cooling efficiency of the carrying roller can be enhanced and heat conduction to the sliding parts can be reduced to a minimum.

Reduction of heat conduction to the sliding parts makes it possible to prevent deterioration of lubricant oil and grease, thus achieving longer operating life of facilities.

The invention set forth in (2) is the cooling method of carrying section set forth in (1), wherein the roller cooling member internally holds a cooling pipe formed along the circular arc of the carrying roller, the pipe being configured to internally circulate a cooling medium.

When the cooling pipe is formed in any shape extending along the circular arc of the carrying roller, for example, by bending the pipe in a meandering pattern to extend along the circular arc of the roller, the pipe can have a wide corresponding area with respect to the surface of the roller. This makes it possible to efficiently cool the carrying roller by the cooling pipe placed nearby and along the outer periphery of the carrying roller.

The invention set forth in (3) is the cooling method of carrying section set forth in (2), wherein the roller cooling member includes a plurality of plate members, and the plate members are arranged, interposing the cooling pipe therebetween, in parallel with a direction of conveying the workpiece.

Accordingly, the laminated plate members can ensure the heat capacity of the roller cooling member and reliably hold the cooling pipe.

The heat capacity of the roller cooling member will influence on the cooling capacity of the carrying conveyor. A larger heat capacity of the roller cooling member is more effective in cooling the carrying roller. Since the heat capacity basically increases in proportion to the volume of the roller cooling member, the use of the plurality of plate members can ensure a desired heat capacity.

Since the cooling pipe is bent along the outer shape of the carrying roller, a configuration that holds the cooling pipe between the plate members can more reliably hold the pipe at lower cost.

The invention set forth in (4) is the cooling method of carrying section set forth in one of (1) to (3), wherein the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

The heat from the outer circumferential part contacting the workpiece will pass through the rib part to the inner circumferential part. Accordingly, when the rib part is designed to have a small cross sectional area, the quantity of heat conduction can be reduced. As a result, heat is unlikely to be conducted to the bearings and the driving mechanism provided on the rotary shaft.

The carrier according to the present invention having the above characteristics can provide the following operations and advantages.

Firstly, the invention set forth in (5) is a carrier for cooling a carrying conveyor by a cooling mechanism, the carrier comprising the carrying conveyor for carrying a workpiece, a heating furnace for heating the workpiece while covering a part of the conveyor, and the cooling mechanism for cooling the conveyor, wherein the carrying conveyor for carrying the workpiece includes a carrying roller that will contact with the workpiece and convey the workpiece; and a roller cooling member is provided as the cooling mechanism, the roller cooling member being configured to surround the outer periphery of the carrying roller and include an opening through which a part of the outer periphery of the carrying roller protrudes.

Accordingly, the carrier can be provided capable of efficiently cooling the carrying roller as with the cooling method of carrying section set forth in (1) by the roller cooling member placed nearby the carrying roller and along the outer periphery of the roller.

The invention set forth in (6) is the carrier set forth in (5), wherein the roller cooling member internally holds a cooling pipe formed along the circular arc of the carrying roller, the pipe being configured to internally circulate a cooling medium.

As with the cooling method of carrying section set forth in (2), consequently, the carrying roller can be efficiently cooled by the cooling pipe placed nearby the carrying roller and along the outer periphery of the roller.

The invention set forth in (7) is the carrier set forth in (6), wherein the roller cooling member includes a plurality of plate members, and the plate members are arranged, interposing the cooling pipe therebetween, in parallel with a direction of conveying the workpiece.

Accordingly, the process of holding the cooling pipe in the roller cooling member can be facilitated and the plate members laminated can ensure the heat capacity of the roller cooling member. As with the cooling method of carrying section set forth in (3), the carrier can be provided capable of efficiently cooling the carrying roller.

The invention set forth in (8) is the carrier set forth in one of (5) to (7), wherein the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

Accordingly, when the rib part is designed to have a small cross sectional area, the quantity of heat conduction can be reduced. As a result, heat is unlikely to be conducted to the bearings and the driving mechanism provided on the rotary shaft as in the cooling method of carrying section set forth in (4).

REFERENCE SIGNS LIST

Figure 1:
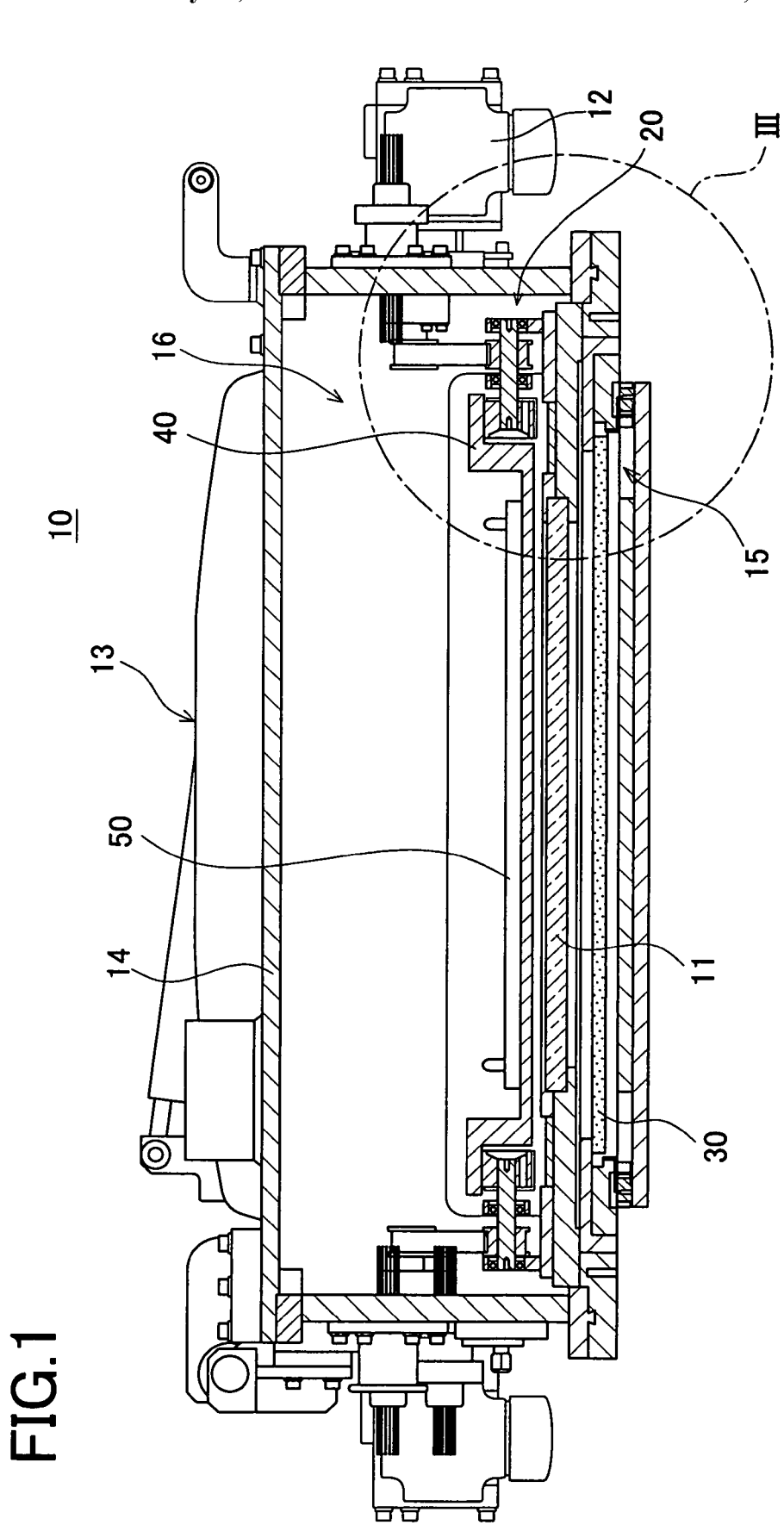
FIG. 1 is a sectional view of a carrier in a first embodiment.

10 Carrier
11 Quartz glass plate
12 Motor
13 Heating furnace
15 Pressure reducing chamber
20 Carrying conveyor
21 Carrying roller
21a Outer circumferential part
21b Inner circumferential part
21c Rib part
21d Opening
22 Driving pulley
23 Rotary shaft
24 Partition wall
25 Roller cooling member
25a Cooling plate
25b Cooling pipe
25c Spacing plate
26 Belt
27 Support wall
30 Halogen heater
40 Carrier pallet
50 Inverter component

DESCRIPTION OF EMBODIMENTS

A detailed description of a preferred embodiment of the present invention will now be given referring to the accompanying drawings.

(First Embodiment)

Figure 2:
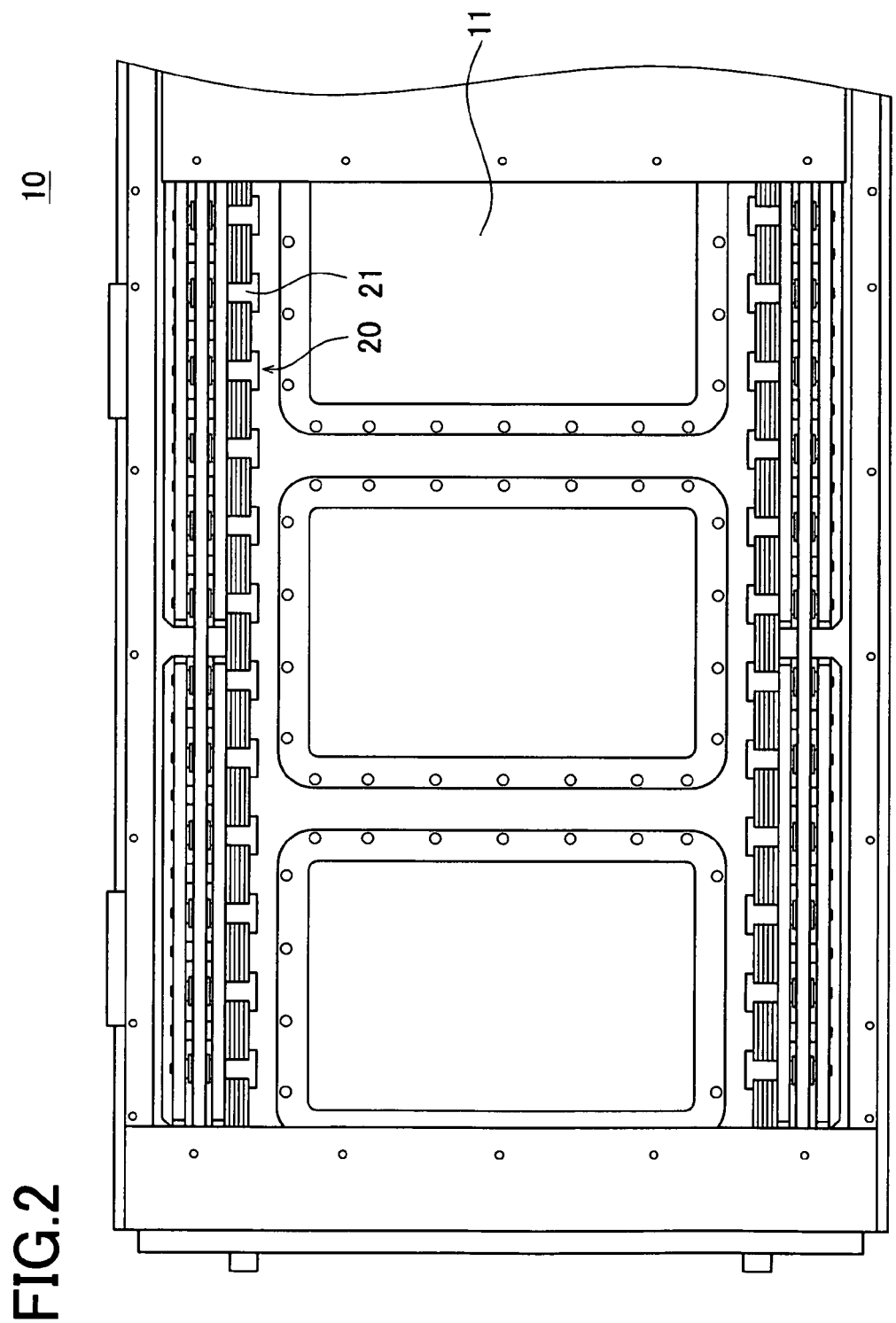
FIG. 2 is a sectional plan view of a carrying conveyor provided in the carrier in the first embodiment.

A configuration in a first embodiment is first explained. FIG. 1 is a sectional view of a carrier 10. FIG. 2 is a plan view of a carrying conveyor 20 provided in the carrier 10. The carrier 10 includes a heating furnace 13, a carrying conveyor 20, and a halogen heater 30. The heating furnace 13 is mainly constituted of a chamber 14 serving as a furnace main body and the halogen heater 30 serving as a heating device. The inside of the chamber 14 is divided by a quartz glass plate 11 into two parts; one above the glass plate 11 is a heating chamber 16 and the other under the same is a pressure reducing chamber 15. The halogen heater 30 is fixedly placed in this pressure reducing chamber 15. The inside of the heating chamber 16 is shielded from outside by a shutter not shown and then filled with an inert gas atmosphere such as nitrogen gas, for example.

The halogen heater 30 is a typical heater including a quartz glass tube filled with a halogen gas and internally provided with a tungsten filament. The heater 30 is configured to emit infrared rays to heat a workpiece. The workpiece to be heated by the heating furnace 13 is an inverter component 50. When heated, the inverter component 50 is soldered.

The halogen heater 30 is fixed in the pressure reducing chamber 15 isolated by the quartz glass plate 11 placed in the lower part of the heating furnace 13 as mentioned above. Since the halogen heater 30 is isolated from the carrying conveyor 20, dust or the like is prevented from entering the heater 30. It is further preferable to fill the pressure reducing chamber 15 with an inert gas such as nitrogen to prevent the halogen heater 30 from deteriorating.

Figure 3:
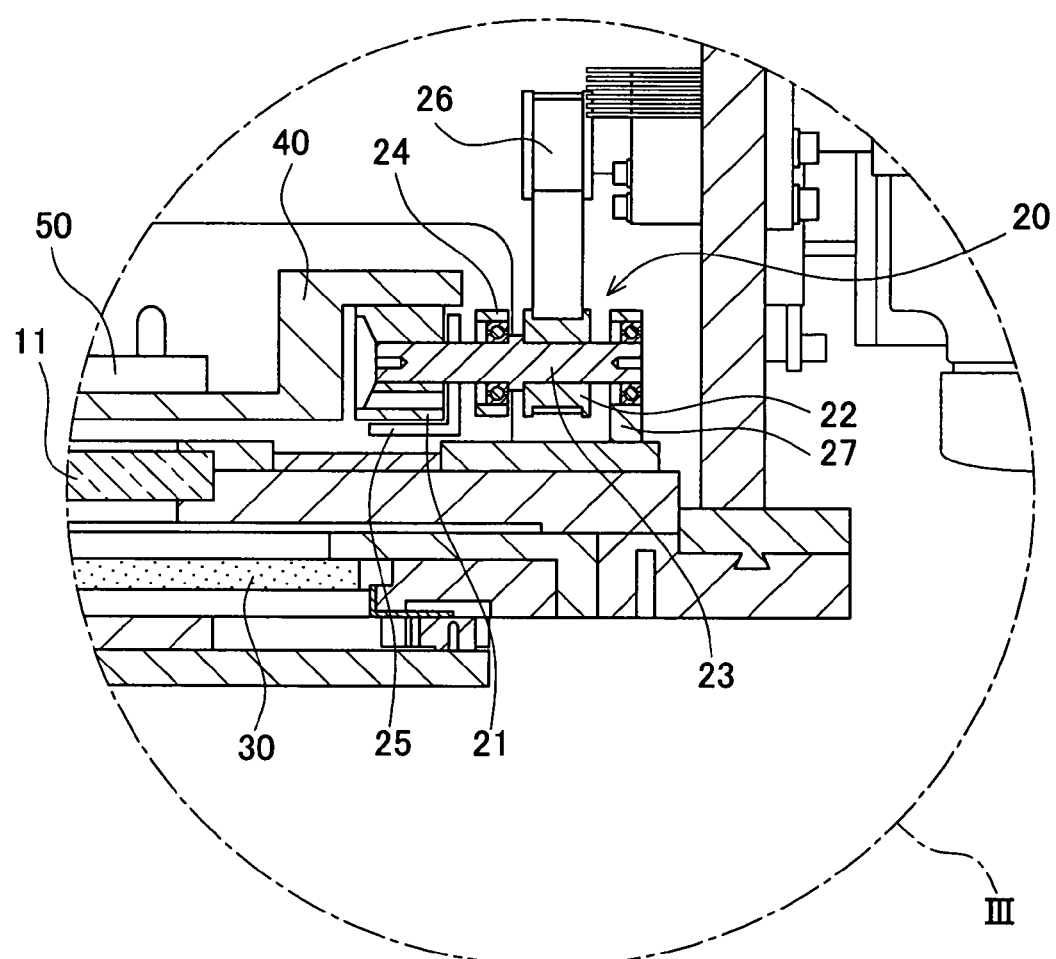
FIG. 3 is an enlarged sectional view of a part of the carrier in the first embodiment.
Figure 4:
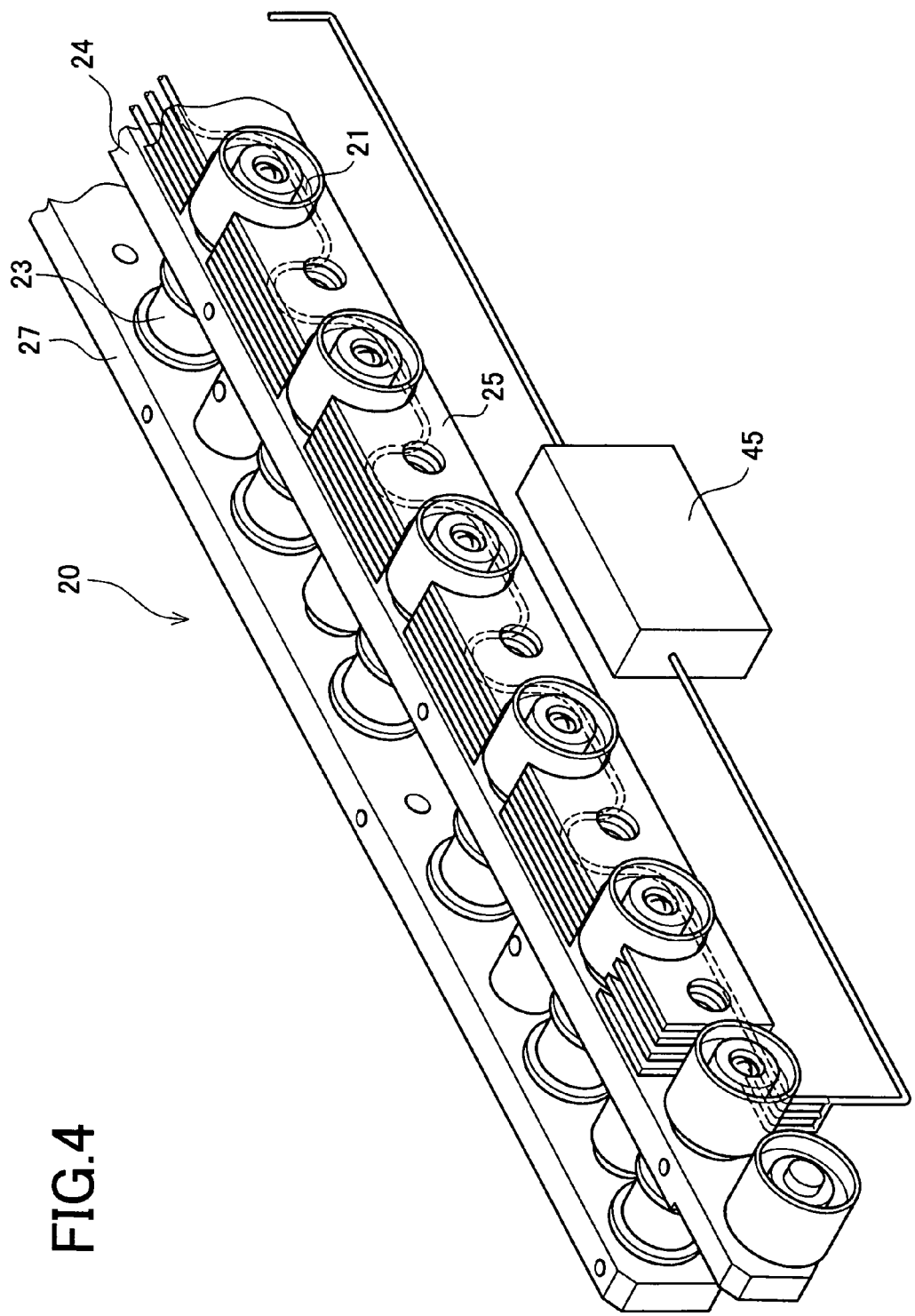
FIG. 4 is an enlarged perspective view of the carrying conveyor in the first embodiment.

FIG. 3 is an enlarged sectional view of part of the carrier 10. This is a sectional view of the carrying conveyor 20. FIG. 4 is a perspective enlarged view of the carrying conveyor 20.

The carrying conveyor 20 placed in the heating furnace 13 is a so-called roller conveyor, configured to rotate a plurality of carrying rollers 21 to moving forward a carrier pallet 40 supported in contact with the rollers 21 in a direction of rotation of the rollers 21. Specifically, both side end portions (shoulder portions) of the carrier pallet 40 are placed on and supported by the rollers 21. The weight of the carrier pallet 40 and the inverter component 50 applies a constant load on the rollers 21. As the rollers 21 are rotated, accordingly, the carrier pallet 40 can be moved in the rotation direction by friction.

This carrier pallet 40 is a pallet for fixedly holding and carrying the inverter component 50. This pallet 40 is made of metal such as aluminum alloy so as to resist the internal temperature of the heating furnace 13. A central part of the carrier pallet 40, that is, a part on which the inverter component 50 is put, is formed with a through hole through which infrared rays from the halogen heater 30 placed in the pressure reducing chamber 15 is allowed to irradiate the inverter component 50.

The chamber 14 in the heating furnace 13 includes a carry-in port for the carrier pallet 40 on an upstream side in the conveying direction of the inverter component 50 and a carry-out port for the carrier pallet 40 on a downstream side in the conveying direction of the inverter component 50. In the lower part of the heating chamber 16 of the chamber 14, carrying conveyors 20 are arranged symmetrically on right and left sides, each extending in a line from the carry-in port to the carry-out port for the carrier pallet 40 in the conveying direction of the inverter component 50. The carrying rollers 21 provided in the carrying conveyor 20 are located at spaced positions from the quartz glass plate 11 as shown in FIG. 1 or 3.

Each carrying roller 21 is fixed to one end of a rotary shaft 23. A driving pulley 22 is mounted on the periphery of a middle part of the rotary shaft 23. The rotary shaft 23 is rotatably supported by bearings provided in a partition wall 24 and a support wall 27 respectively.

The driving pulley 22 fitted on the rotary shaft 23 is located more outside than the carrying roller 21. This is because a belt 26 placed over the driving pulley 22 is made of resin, inferior in heat resistance. The inside of the heating furnace 13 is preferably compact in consideration of the heating efficiency. However, the driving pulley 22 and the belt 26 are preferably placed as outermost as possible.

Rotation of the motor 12 mounted outside the heating furnace 13 is transmitted to the driving pulley 22 through the belt 26. The pulley 22 then transmits the rotation to the rotary shaft 23. Thus, as the pulley 22 is rotated, the carrying roller 21 fixed to the rotary shaft 23 is also rotated.

Figure 5:
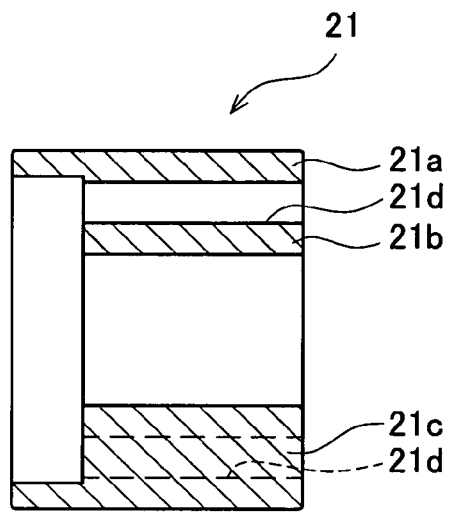
FIG. 5 is a sectional view of a carrying roller in the first embodiment.
Figure 6:
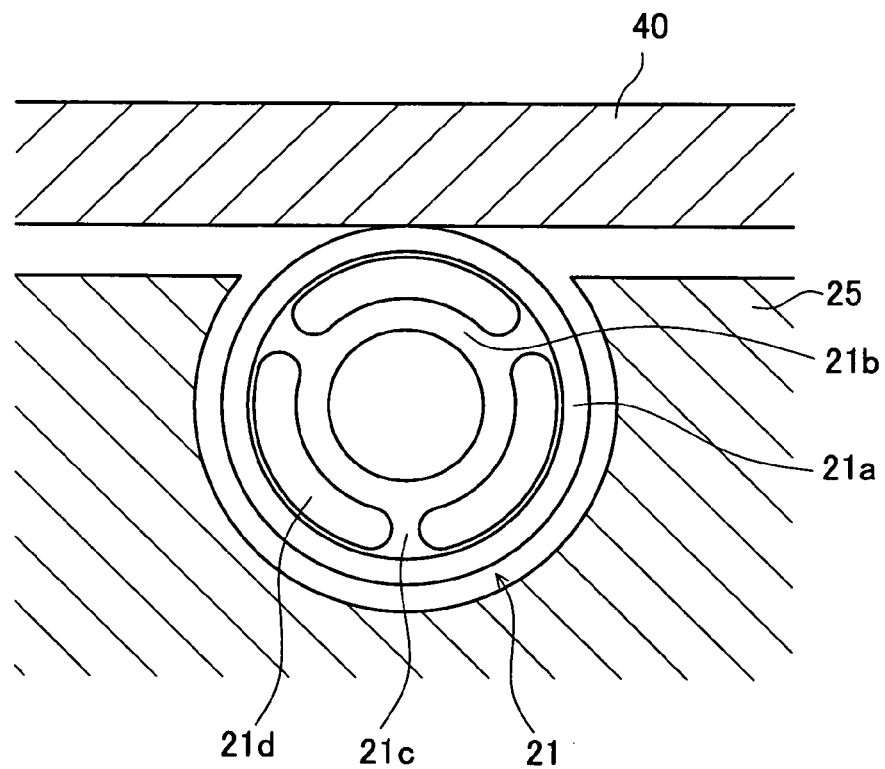
FIG. 6 is a view showing a state of the carrying roller that conveys a carrier pallet in the first embodiment.

FIG. 5 is a sectional view of the carrying roller 21. FIG. 6 shows a state of the carrying roller 21 that conveys the carrier pallet 40.

Each carrying roller 21 includes an outer circumferential part 21a that will contact with the carrier pallet 40, an inner circumferential part 21b connected to the rotary shaft 23, and rib parts 21c each joining the outer circumferential part 21a and the inner circumferential part 21b. The outer circumferential part 21a and the inner circumferential part 21b are supported by the rib parts 21c with cutouts 21d formed at three places.

The carrying roller 21 is made of stainless steel, e.g., SUS304, but also may be formed of any materials other than SUS304. However, since the inside of the heating furnace 13 becomes hot, a preferable material is resistant to oxidation and contains no carbon to avoid deterioration caused by hydrogen brittleness.

The ratio between the rib parts 21c and the cutouts 21d is preferably determined to provide each cutout 21d enough wide not to cause any trouble in the carrying roller 21 in conveying the carrier pallet 40.

Figure 7:
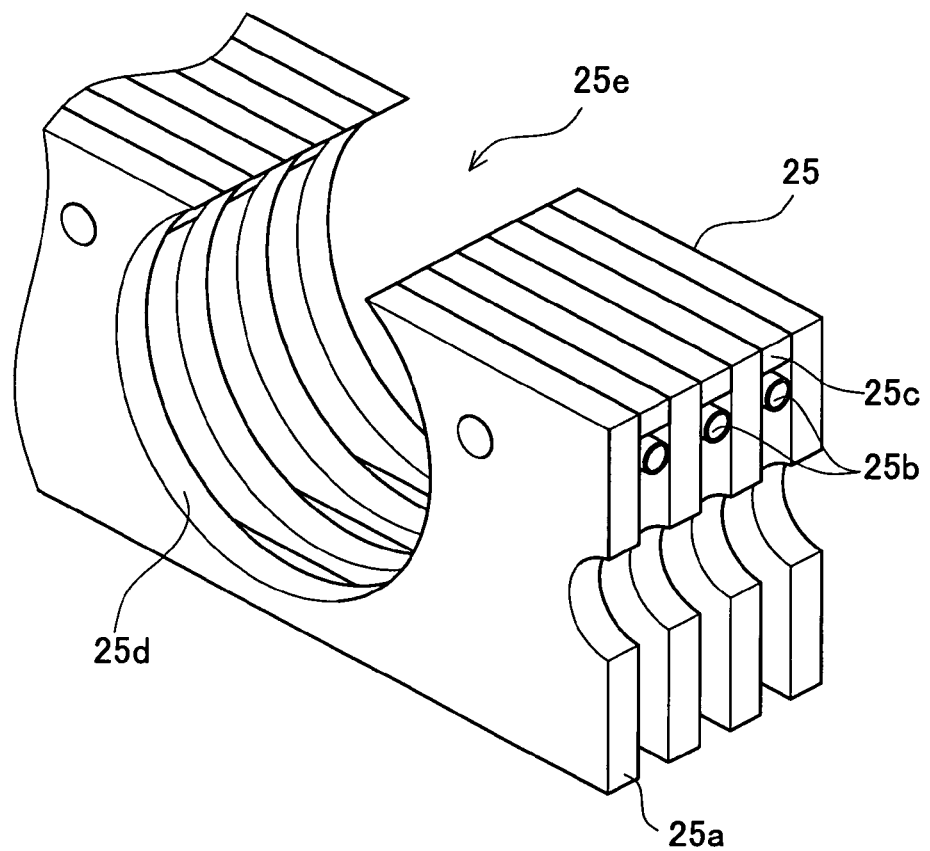
FIG. 7 is a perspective view of a roller cooling member in the first embodiment.
Figure 8:
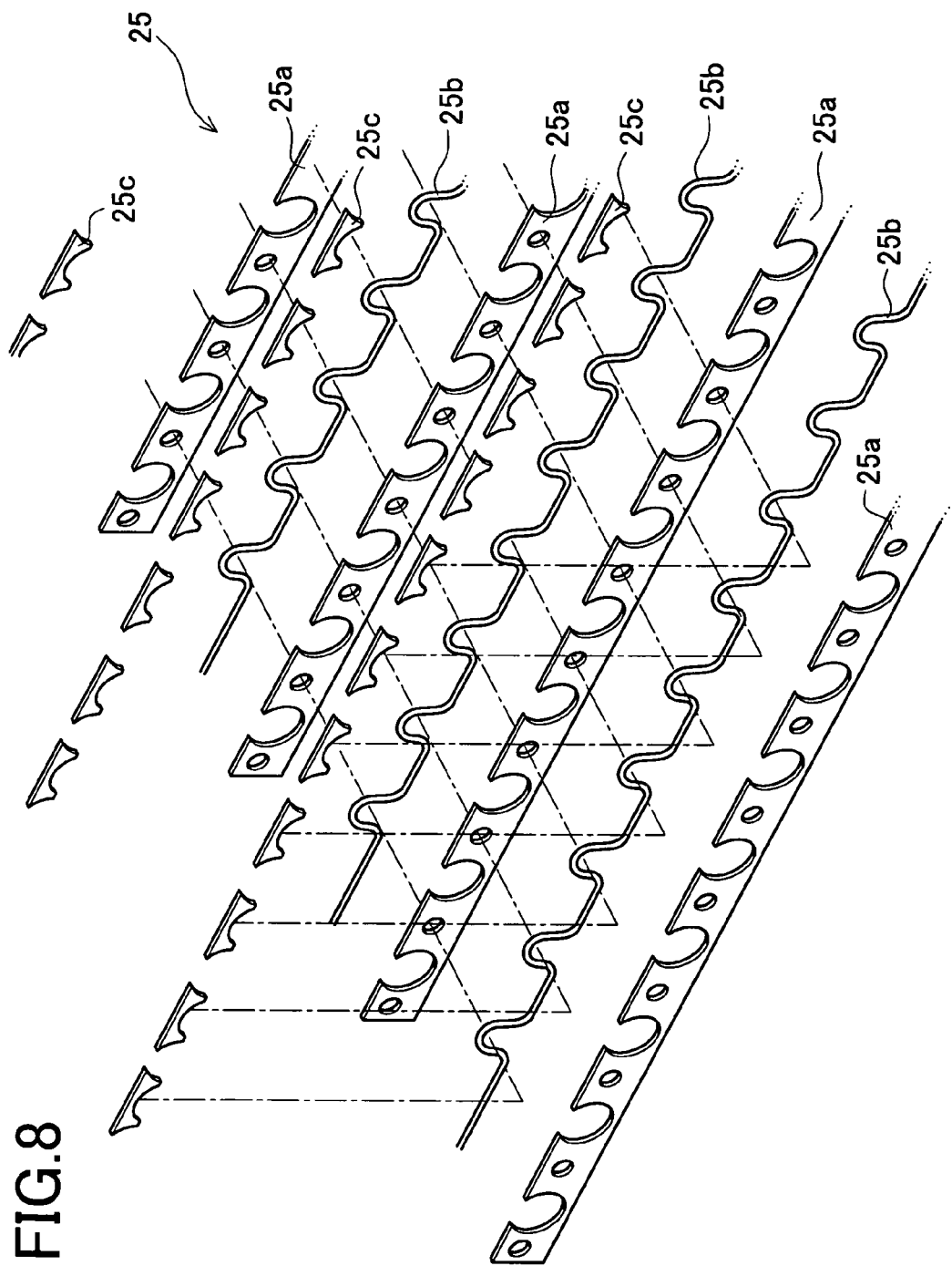
FIG. 8 is an exploded perspective view of the roller cooling member in the first embodiment.

FIG. 7 is a perspective view of the roller cooling member 25. FIG. 8 is an exploded perspective view of the roller cooling member 25.

The roller cooling member 25 is placed to bridge a gap between the adjacent carrying rollers 21 and cover most part of the outer periphery of each carrying roller 21 as shown in FIG. 4.

The roller cooling member 25 includes cooling plates 25a, cooling pipes 25b, and spacing plates 25c. Each component is made of oxygen-free copper, e.g., C1020. Any material other than oxygen-free copper may be adopted but a high heat conducting material is preferably selected.

Each cooling plate 25a is a plate member formed with holes 25d each being circular along the outer shape of the carrying roller 21. An open part of this hole 25d forms an opening 25e of the roller cooling member 25. In the case where the carrying rollers 21 and the cooling plates 25a are placed in combination as shown in FIG. 6, a part of a roller surface of each roller 21 protrudes from the opening 25e of the roller cooling member 25. For example, each roller 21 is placed to protrude from the opening 25e by about 1 mm. The carrier pallet 40 is put on the roller surface(s) of the carrying roller(s) 21 protruding from the opening 25e. The opening 25e has the size larger by about 1 mm than the outer diameter of each roller 21.

Each spacing plate 25c serves as a spacer sandwiched between the adjacent cooling plates 25a and is arranged between the adjacent carrying rollers 21. Each cooling pipe 25b is held and fixed between the cooling plates 25a. Each cooling pipe 25b is a pipe for circulating a cooling medium. Each cooling pipe 25b is formed to curve in a meandering pattern as shown in FIG. 8. Each curved portion curves along the outer periphery of the carrying roller 21.

To be concrete, each cooling pipe 25b is formed in a curved shape so that each upper curve portion of the pipe 25b is located on the side of the spacing plates 25c assembled as the roller cooling member 25 and each bottom portion of the pipe 25b is located on the side of the carrying roller 21 installed in the carrying conveyor 20 as a cooling mechanism.

The cooling member 25 is connected to a cooling medium circulating device 45 as shown in FIG. 4. This cooling medium circulating device 45 has a function of cooling the cooling medium using a heat exchanger. For example, a chiller unit may be adopted.

The first embodiment having the above configuration exhibits the operations explained below.

The carrying conveyor 20 provided in the heating furnace 13 is operated to convey the inverter component 50 put on the carrier pallet 40 from a carrying conveyor not shown provided outside the heating furnace 13 into the heating furnace 13 and convey the heated inverter component 50 to the outside.

The workpiece is an inverter component 50 to be mounted in a vehicle and thus electronic components have to be mounted on the inverter component 50. Accordingly, a soldering foil is put on the upper surface of the inverter component 50 in an upstream process of the heating furnace 13 and then the electronic components are placed thereon.

The carrier pallet 40 is supported and conveyed by the rotating rollers 21. Thus, the inverter component 50 placed on the carrier pallet 40 is also carried into the heating furnace 13.

Figure 9:
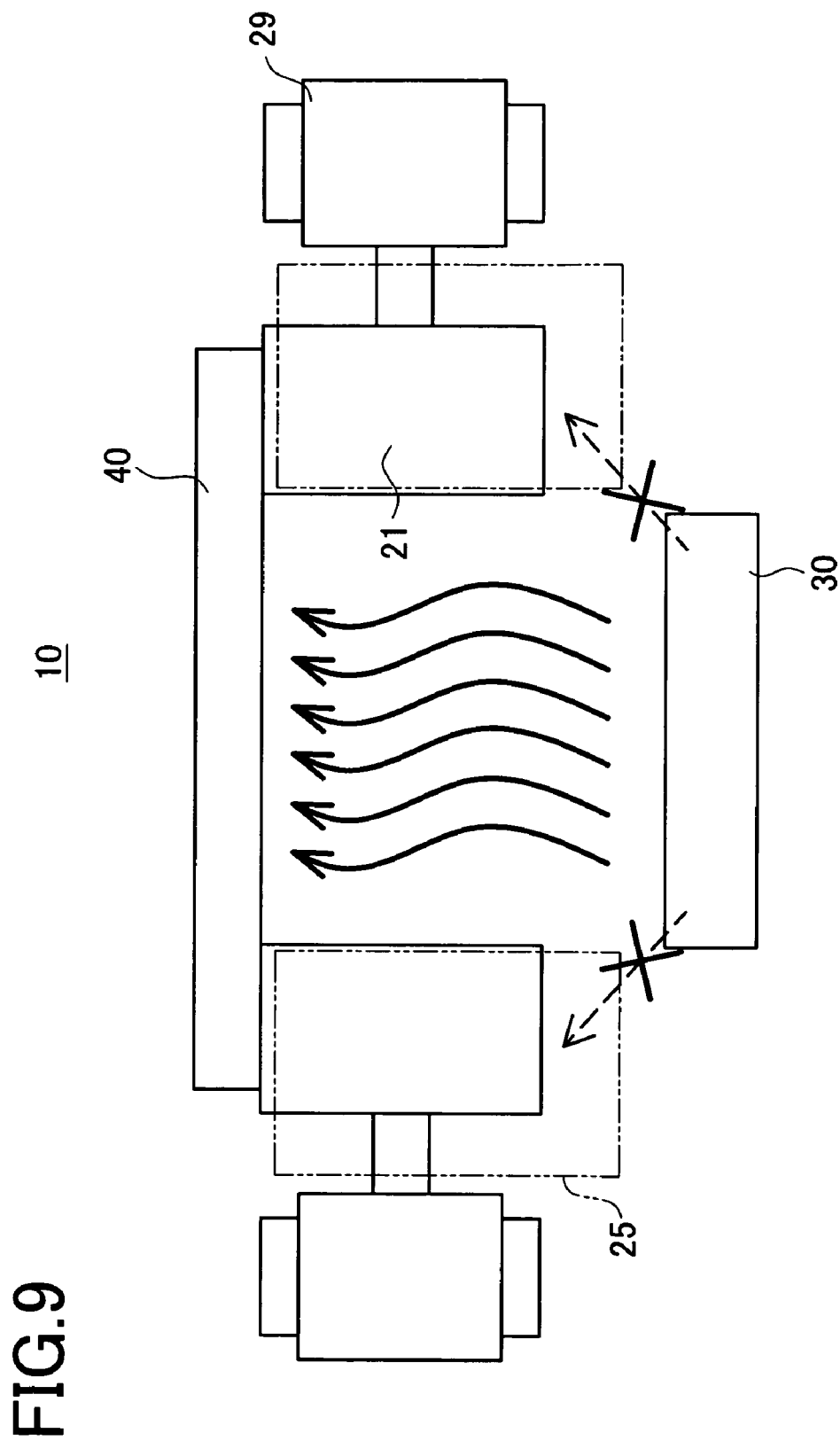
FIG. 9 is a view showing heat conduction from a halogen heater in the first embodiment.
Figure 10:
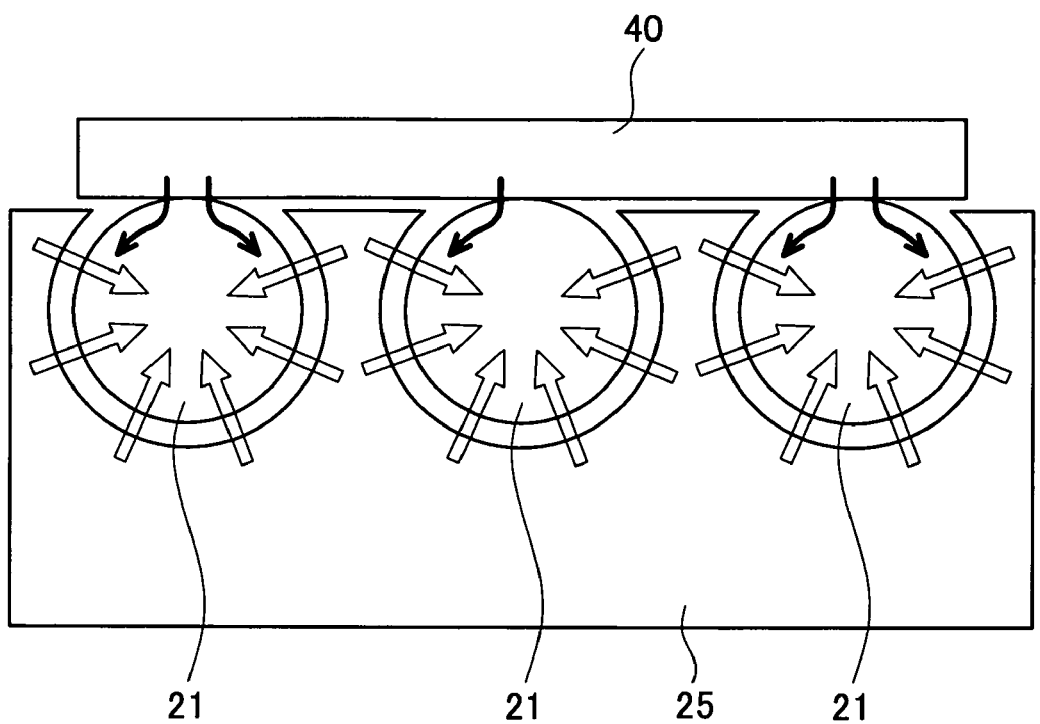
FIG. 10 is a view showing heat conduction from the carrier pallet to the carrying roller in the first embodiment.

FIG. 9 is a view schematically showing heat radiation from the halogen heater 30 in the heating furnace 13. FIG. 10 is a view showing the way of heat conduction from the carrier pallet 40 to the rollers 21, in which black arrows represent heating and outline arrows represent cooling.

The inverter component 50 positioned in a predetermined place in the heating chamber 16 is heated by infrared rays emitted from the halogen heater 30. A melting point of soldering is about 220° C. and hence the inverter component 50 is heated up to about 300° C.

Consequently, the carrier pallet 40 contacting the inverter component 50 is also heated by radiation from the halogen heater 30 and is subjected to heat conduction from the inverter component 50, increasing in temperature up to near the temperature of the inverter component 50.

Thus, the rollers 21 contacting the carrier pallet 40 are also subjected to heat conduction from the contact portions with the carrier pallet 40.

Therefore, for the purpose of cooling the rollers 21, the roller cooling member 25 is provided. A cooling medium is caused to flow through each cooling pipe 25b of the roller cooling member 25.

Each carrying roller 21 is surrounded by the roller cooling member 25 with a fixed clearance. This clearance is about 1 mm. Each pipe 25b of the roller cooling member 25 is kept at a low temperature by the cooling medium flowing therethrough. Accordingly, a temperature gradient occurs between the carrying rollers 21 and the roller cooling member 25 as shown in FIG. 10. The heat of each roller 21 is indirectly removed from the roller cooling member 25 through an inert gas such as N2.

The configuration that surrounds a most part of the outer periphery of each roller 21 by the roller cooling member 25 also provides the effect of preventing overheating of each roller 21.

Heating by the halogen heater 30 is performed by irradiation of infrared rays. Thus, the temperature of an object irradiated by the infrared rays is likely to rise. Since the most part of the outer periphery of each roller 21 is surrounded by the roller cooling member 25, heat input from the outer peripheral surface of each roller 21 is restricted to a contact portion with the carrier pallet 40 and a contact portion (a roller end face) of each roller 21 exposed to the heated atmospheric gas. Thus, a route of heat input can be minimized.

Each carrying roller 21 is configured such that the outer circumferential part 21a and the inner circumferential part 21b are connected by the rib parts 21c as shown in FIGS. 5 and 6. The heat conducted to the outer circumferential part 21a will be conducted to the inner circumferential part 21b through the rib parts 21c.

If the cutouts 21d are formed largely to provide narrower rib parts 21c, the rib parts 21c have lower heat conduction efficiency and accordingly the heat is likely to stay in the outer circumferential part 21a. Accordingly, the roller cooling member 25 can make more efficient cooling.

Providing the cutouts 21d can increase the surface area of each roller 21, which also contributes to cooling of each roller 21.

The roller cooling member 25 is configured to include several cooling pipes 25b internally arranged to further improve the cooling efficiency. Each pipe 25b is bent along the outer shape of each roller 21. Such bending can widen the contact surface area and improve the cooling efficiency. Furthermore, the use of a material having a high thermal conductivity enhances the cooling efficiency.

As above, the roller cooling member 25 cools the rollers 21 indirectly (in non contact relation) through inert gas, thus preventing a temperature rise of each roller 21.

A shutter not shown provided in the heating furnace 13 is closed to increase the temperature. In the heating furnace 13, accordingly, the carrying conveyor 20 is also apt to be heated. However, passing of the cooling medium through each cooling pipe 25b of the roller cooling member 25 enables sufficient cooling.

The inverter component 50 heated in the heating furnace 13 is carried on the carrier pallet 40 to the outside of the heating furnace 13 by operation of the carrying conveyor 20. The inverter component 50 is then cooled on a conveyor not shown in a downstream process of the carrier 10, and the soldering foil heated and melted in the heating furnace 13 is solidified, thus soldering the electronic components to the inverter component 50.

The first embodiment exhibits the above configurations and operations and therefore can provide the effects explained below.

A first effect is to efficiently cool the carrying rollers 21. The cooling method of carrying section for cooling the carrying conveyor 20 by the cooling mechanism includes the conveyor 20 for conveying the inverter component 50, the heating furnace 13 for heating the inverter component 50 while covering part of the conveyor, and the cooling mechanism for cooling the conveyor 20. The conveyor 20 for conveying the inverter component 50 includes the rollers 21 which will contact with the carrier pallet 40 to convey the inverter component 50. The roller cooling member 25 serving as the cooling mechanism surrounds the outer periphery of each roller 21 and includes the opening 25e through which part of the outer periphery of each roller 21 protrudes. The roller cooling member 25 cools the rollers 21 heated by heat in the heating furnace 13.

In the roller cooling member 25, the cooling pipes 25b formed extending along the circular arc of each roller 21 are held, through the inside of which the cooling medium is caused to circulate.

The carrying rollers 21 are cooled by the cooling medium caused to flow through the pipes 25b in the roller cooling member 25.

As mentioned above, each pipe 25b is bent along the outer shape of each carrying roller 21 to contact with more surface areas of the cooling plates 25a, increasing an water amount per unit volume, thereby further enhancing the cooling efficiency.

The applicants have confirmed from the studies that, when the inverter component 50 is heated to 300°, the temperature of the carrying rollers 21 reach about 150° C. in the case of no cooling, whereas the temperature of the rollers 21 can be kept below 80° C. or less when cooled by the roller cooling member 25.

As mentioned in the section of Technical Problem, when the heat is conducted from the carrying roller 21 to the rotary shaft 23 and the driving pulley 22, the heat may affect a lubricating system and a driving system.

The bearing which holds the rotary shaft is applied with lubricant oil or grease as a lubricant agent. The lubricant agent is more liable to deteriorate as the temperature is higher. Accordingly, the bearing is desired to be kept at as lower a temperature as possible. Naturally, at high temperatures, not only the lubricant oil or grease but also the bearing itself may be deformed, resulting in an increase in rolling resistance.

The belt 26 placed over the driving pulley 22 is made of resin, which may cause disadvantages that even a high heat resistant material is stretched out or deformed.

It is feared that thermal expansion of the rollers 21 themselves may cause the carrier pallet 40 to meander. If all the rollers 21 uniformly expand, no problem occurs. However, when only the rollers 21 on one side thermally expand, a diameter difference takes place between the rollers 21 on the right side and the roller 21 on the left side, thus causing the carrier pallet 40 to meander. If the meandering movement of the carrier pallets 40 brings about line stop, for instance, congestion of the carrier pallets 40 inside the heating furnace 13, the productivity will decreases. It is therefore possible to avoid a temperature rise of the rollers 21 themselves.

According to the first embodiment, however, since the rollers 21 are cooled by the roller cooling member 25, the rollers 21 can be efficiently cooled. This makes it possible to prevent deterioration of the lubricating system and the driving system and avoid an increase in rolling resistance resulting from expansion of the bearing and the rotary shaft 23, and further prevent meandering movement of the carrier pallets 40 resulting from expansion of the rollers 21.

A second effect is to easily produce the roller cooling member 25 by laminating the cooling members 25a and holding the cooling pipes 25b therebetween.

The roller cooling member 25 is constituted of a plurality of cooling plates 25a. The cooling plates 25a are placed in parallel with the conveying direction of the carrier pallet 40 and stacked interposing the pipes 25b therebetween. Thus, the roller cooling member 25 internally containing the pipes 25b can be easily produced.

Each pipe 25b is formed to be bent in a meandering pattern along the outer periphery of each roller 21. Forming such flow passage in the roller cooling member 25 is very difficult.

To form the flow passage having a plurality of curved portions in the roller cooling member 25, therefore, a pipe is bent into a predetermined shape to make the cooling pipe 25b, and the pipe 25b is placed between the cooling plates 25a. This configuration can facilitate production of the roller cooling member 25.

Furthermore, it is preferable that the pipes 25b are separable to enable replacement and others in consideration of maintenance and others.

A third effect is that the heat of the outer circumferential part 21a of the carrying roller 21 is hard to be conducted to the inner circumferential part 21b, thus achieving higher cooling efficiency.

Each carrying roller 21 includes the outer circumferential part 21a which will contact with the carrier pallet 40, the inner circumferential part 21b placed inside the outer circumferential part 21a with the cutouts interposed therebetween and fitted on the rotary shaft, and the rib parts 21c joining the outer circumferential part 21a and the inner circumferential part 21b. Accordingly, the heat from the outer circumferential part 21a contacting with the carrier pallet 40 on which the inverter component 50 is put will be conducted to the inner circumferential part 21b through the rib parts 21c. When each rib part 21c is formed with a smaller cross sectional area, the quantity of heat conduction can be reduced. Thus, the heat is hard to be conducted to the bearing and the driving mechanism provided in the rotary shaft 23.

Since the cooling efficiency of the roller cooling member 25 is increased and the thermal conductivity from the outer circumferential part 21a to the inner circumferential part 21b of the carrying roller 21 is decreased, the effect of preventing deterioration of the lubricant oil on the bearing supporting the rotary shaft 23 and the belt 26 placed over the driving pulley 22 can be enhanced.

In the carrying conveyor 20, the partition wall 24 is provided to hold the rotary shaft 23 with the bearing and serve to block irradiation of infrared rays from the halogen heater 30, thus preventing the infrared rays from directly impinging on the belt 26.

(Second Embodiment)

Figure 11:
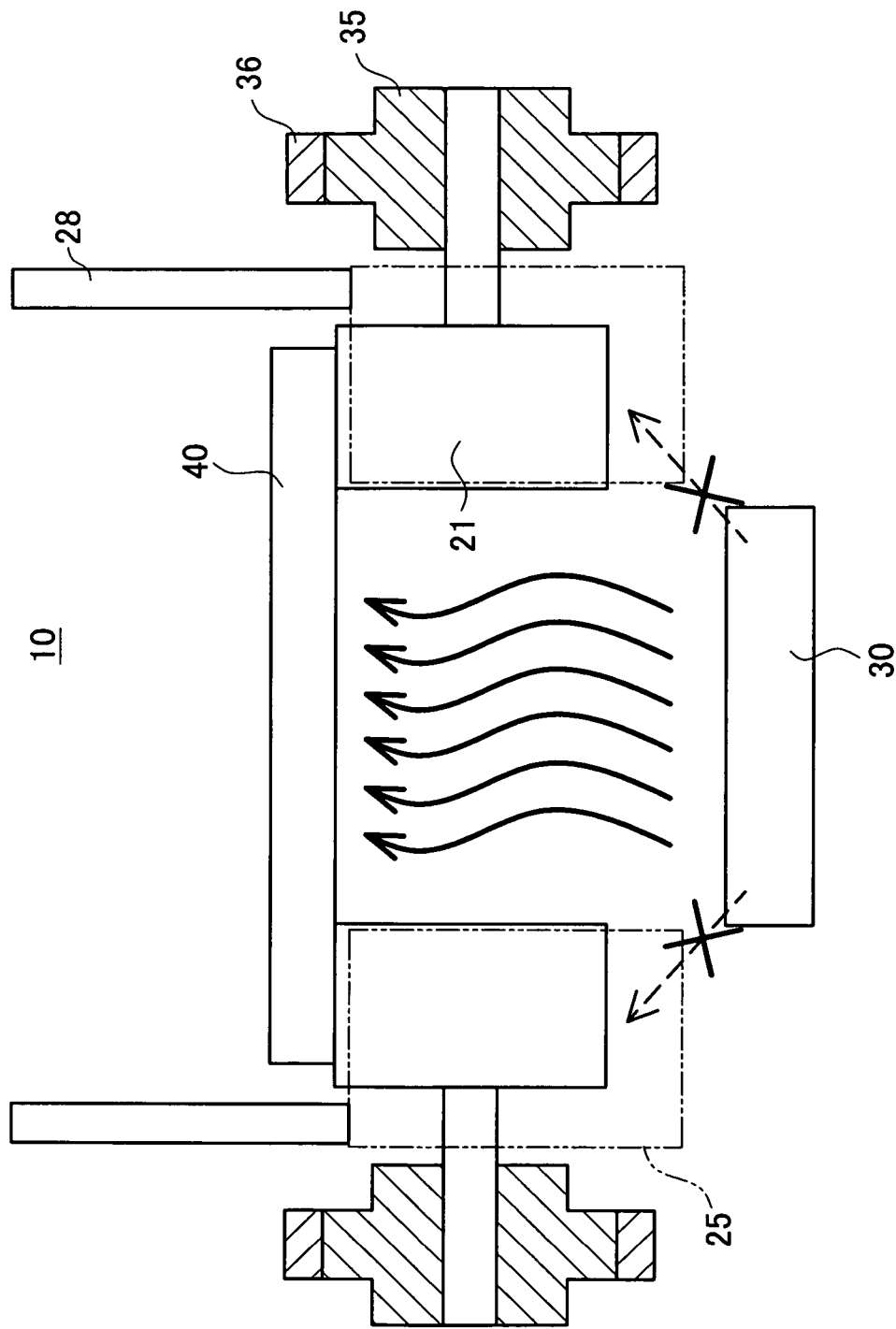
FIG. 11 is a schematic sectional view of a carrier in a second embodiment.

FIG. 11 is a schematic sectional view of a carrier 10 in a second embodiment. The second embodiment is substantially identical in configuration but is slightly different in the driving mechanism. In the second embodiment, a sprocket 35 and a chain 36 are used for driving the carrying conveyor 20, instead of the driving pulley 22. A dust blocking wall 28 is provided on top of the roller cooling member 25. The dust blocking wall 28 may be placed on top of the partition wall 24. As another alternative, the partition wall 24 may be extended to form the dust blocking wall 28.

In other words, the method of transmitting driving power is achieved by use of the driving pulley 22 and the belt 26 in the first embodiment. Instead thereof, in the second embodiment, the sprocket 35 and the chain 36 are provided and the dust blocking wall 28 is placed.

In general, the combination of the driving pulley 22 and the belt 26 is expected to provide a mechanism having lower dust occurrence than the combination of the sprocket 35 and the chain 36. However, the configuration adopting the sprocket 35 and the chain 36 is expected to achieve cost reduction and also higher heat resistance and longer life.

Also, regarding the dust occurrence problem of the sprocket 35 and the chain 36, the dust blocking wall 28 is provided to prevent dust from going toward the inverter component 50.

The effects are substantially the same as in the first embodiment. However, the above merits in terms of cost reduction and maintenance can be expected.

(Third Embodiment)

A third embodiment is substantially identical in configuration to that in the first embodiment but is slightly different in the configuration of the roller cooling member 25.

Figure 12:
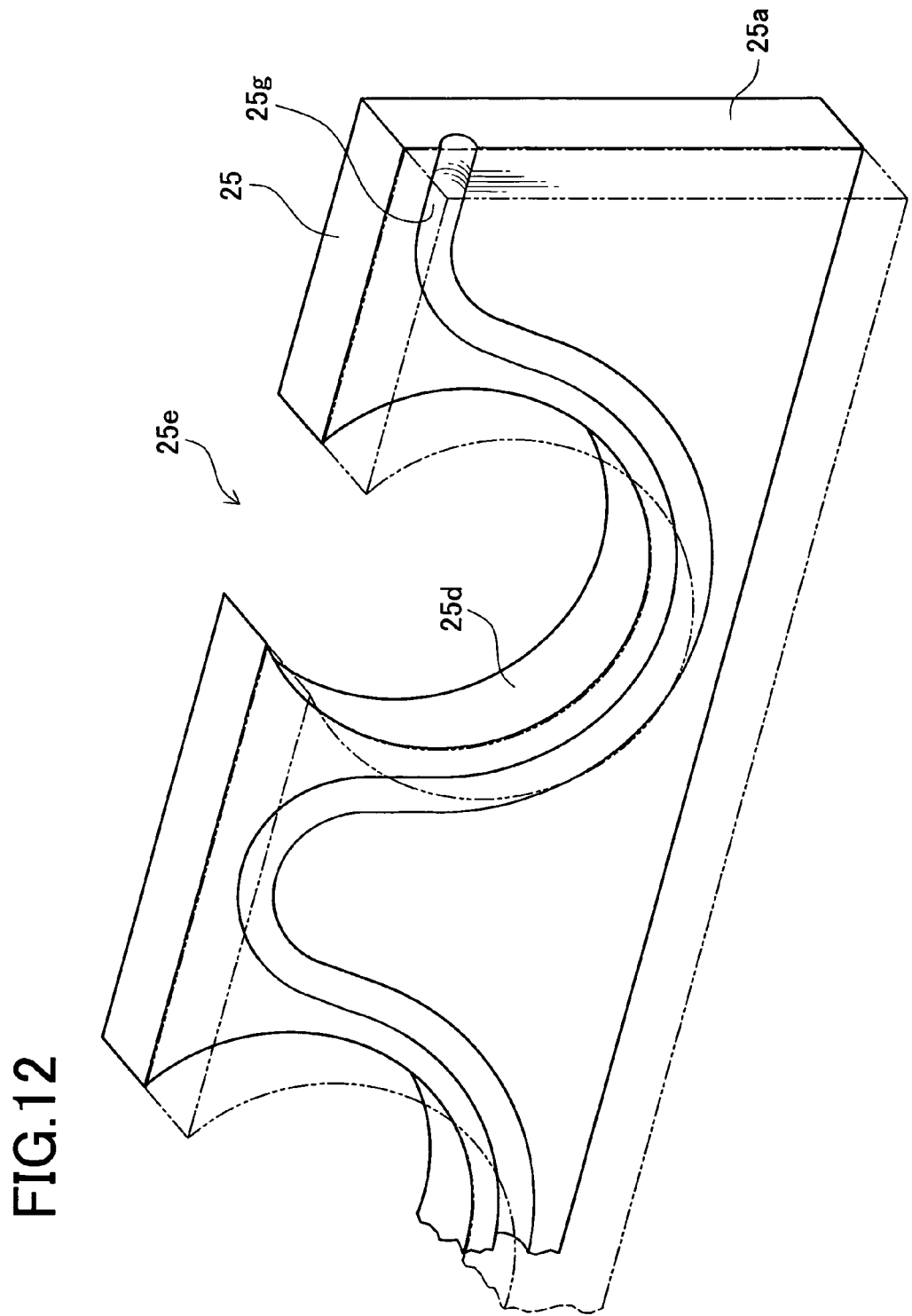
FIG. 12 is a schematic sectional view of a carrier in a third embodiment.

FIG. 12 is a perspective view of a roller cooling member 25 in the third embodiment.

The roller cooling member 25 in the third embodiment is configured such that a cooling water channel groove 25g is machined in a cooling plate 25a and another cooling plate 25a is stacked on the former to close the groove 25g, and a plurality of the configurations are appropriately stacked. The cooling water channel groove 25g is used instead of the cooling pipe 25b. As another alternative, the latter cooling plate 25a to be stacked on the former may also be formed with a cooling water channel groove 25g.

Even though there is a problem that sealing performance is low, the thermal capacity of the roller cooling member 25 can be increased.

The present invention is explained in the embodiments but not limited thereto. The present invention may be embodied in other specific forms without departing from the essential characteristics thereof.

For instance, in the first and second embodiments, the heating furnace 13 is used for soldering of the inverter component 50 and the carrying conveyor 20 is cooled. The invention may be applied to different workpieces. Furthermore, the invention may be used for cooling not only the inside of the heating furnace 13 but also in a downstream process of the carrier 10.

The materials shown in the embodiments are not particularly limited thereto.

The invention claimed is:

1. A cooling method of carrying section for cooling a carrying conveyor by a cooling mechanism, the method comprising the carrying conveyor configured to convey a workpiece, a heating furnace configured to cover a part of the conveyor and heat the workpiece, and the cooling mechanism for cooling the conveyor, wherein
the carrying conveyor for conveying the workpiece includes a carrying roller that will contact with the workpiece and convey the workpiece;
a roller cooling member is provided as the cooling mechanism, the roller cooling member being configured to surround an outer periphery of the carrying roller and include an opening through which a part of the outer periphery of the carrying roller protrudes;
the carrying roller heated by heat of the heating furnace is cooled by the roller cooling member,
the roller cooling member internally holds a cooling pipe formed along a circular arc of the carrying roller, the pipe being configured to internally circulate a cooling medium:
the roller cooling member includes a plurality of plate members; and
the plate members are arranged, interposing the cooling pipe therebetween, in parallel with a direction of conveying the workpiece.

2. The cooling method of carrying section according to claim 1, wherein
the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

3. A carrier for cooling a carrying conveyor by a cooling mechanism, the carrier comprising the carrying conveyor for carrying a workpiece, a heating furnace for heating the workpiece while covering a part of the conveyor, and the cooling mechanism for cooling the conveyor, wherein
the carrying conveyor for carrying the workpiece includes a carrying roller that will contact with the workpiece and convey the workpiece;
a roller cooling member is provided as the cooling mechanism, the roller cooling member being configured to surround an outer periphery of the carrying roller and include an opening through which a part of the outer periphery of the carrying roller protrudes:
the roller cooling member internally holds a cooling pipe formed along a circular arc of the carrying roller, the pipe being configured to internally circulate a cooling medium,
the roller cooling member includes a plurality of plate members; and
the plate members are arranged, interposing the cooling pipe therebetween, in parallel with a direction of conveying the workpiece.

4. The cooling method of carrying section according to claim 3, wherein
the carrying roller includes an outer circumferential part that will contact with the workpiece, an inner circumferential part provided inside the outer circumferential part with a cutout being interposed therebetween, the inner circumferential part being attached to a rotary shaft, and a rib part that joins the outer circumferential part and the inner circumferential part.

* * * * *